United States Patent [19]

Hollister

[11] Patent Number: 4,951,214

[45] Date of Patent: Aug. 21, 1990

[54] METHOD FOR PASSIVELY DETERMINING THE RELATIVE POSITION OF A MOVING OBSERVER WITH RESPECT TO A STATIONARY OBJECT

[75] Inventor: Floyd H. Hollister, Dallas, Tex.

[73] Assignee: Texas Instruments Incorporated, Dallas, Tex.

[21] Appl. No.: 356,583

[22] Filed: May 22, 1989

Related U.S. Application Data

[63] Continuation-in-part of Ser. No. 273,648, Nov. 18, 1988, which is a continuation of Ser. No. 6,270, Jan. 5, 1987, abandoned, which is a continuation of Ser. No. 568,978, Jan. 6, 1984, abandoned.

[51] Int. Cl.$^5$ .............................................. G06F 15/20
[52] U.S. Cl. .................................... 364/460; 364/443; 73/178 R
[58] Field of Search ............... 364/443, 449, 450, 460, 364/458; 73/178 R; 342/64, 451, 455, 417

[56] References Cited

U.S. PATENT DOCUMENTS

| | | | |
|---|---|---|---|
| 3,975,731 | 8/1976 | Latham et al. | 364/451 |
| 4,144,571 | 3/1979 | Webber | 364/450 |
| 4,238,824 | 12/1980 | DeMatte et al. | 364/449 |
| 4,495,580 | 1/1985 | Keearns | 364/450 |
| 4,533,918 | 8/1985 | Virnot | 342/451 |

Primary Examiner—Gary Chin
Attorney, Agent, or Firm—Melvin Sharp; James T. Comfort; L. Joy Griebenow

[57] ABSTRACT

A method for passive relative ranging between a position of a moving observer and a stationary remote object includes measuring a plurality of angles at the observer's position to the object from a reference direction at selected or arbitrary time intervals. From the measured angles, calculating the current relative location of the observer with respect to the object, using a non-recursive least square technique employing a Moore-Penrose pseudo-matrix-inverse. The technique is carried out in a general or special purpose digital computer by a program using a predetermined number of variables in which products derived from the measured angles are accumulated, without growth in the number or complexity of calculations with an increasing number of measured angles.

33 Claims, 2 Drawing Sheets

METHOD FOR PASSIVELY DETERMINING THE RELATIVE POSITION OF A MOVING OBSERVER WITH RESPECT TO A STATIONARY OBJECT

This application is a continuation of Ser. No. 273,648, filed 11/18/88, which is a continuation of application Ser. No. 6,270 now abandoned, filed 1/5/87, which is a continuation of application Ser. No. 568,978, filed Jan. 6, 1984, now abandoned.

BACKGROUND OF THE INVENTION

1. Field of the Invention

This invention relates to improvements in passive methods for determining the position of a moving observer with respect to a remote object or objects, and more particularly to improvements in such methods for enabling vehicular maneuvering with respect to remote objects for robotic control, navigation, and the like.

2. Description of the Prior Art

The problem of passively determining the position of a moving object with respect to a surrounding object or objects has long been vexatious. This is so because ambiguities which often enter into calculations and measurements usually cannot be controlled. This can be seen for example in considering an observer who is moving along a path directly toward a remote object and who takes a sequence of angular measurements to the remote object with respect to, for instance, a fixed x-y-z coordinate frame. It will be seen that the measurements which are taken are constant, and, therefore, the location of the remote object is indeterminate.

In addition, in making such angular measurements, there is always the possibility of error with respect to each measurement. It can be seen that if, for example, two angular measurements were made, each with some finite error factor, the true angles could be expressed as being only within plus or minus some error amount on either side of the measured angles. The object, therefore, can only be located somewhere within an area defined by the angular deviations of the error from the measured angles.

Many solutions to this problem have been suggested in the past; however, none enable the possibility of reducing the computational requirements to a level which would make real time vehicle control feasible, at least to the extent is achievable by, for example, by present active navigational devices. In addition, even with the fast digital processing equipment becoming ever increasingly available and lower in cost, the computation time required to process the great quantities of data generated by previous solutions to this problem has precluded serious consideration of passive position determination as being impractical in most real time applications.

More specifically, in dealing with the data generated by in making such measurements, many problems have been confronted by investigators in the past. For example, it has been proposed to apply recursive Kalman-Bucy filter techniques to matrix representations of the data. The Kalman-Bucy filter techniques, however, require the application of certain linearization assumptions, as well as system initializations, and result in a large computational burden, requiring large, fast computing support. The initializations mentioned include, among other things, a requirement for the inputting of a first estimate of the position of the remote object together with the inputting of the allowable error deviation permitted in the difference between the actual position and the estimated position. This can result, in certain cases, in the technique being unable to produce an accurate estimate of the position of the remote object, if, for example, the original position estimate is outside the permitted deviation. That is to say, in some cases, the Kalman-Buch filter fails to converge on an answer representing the location of the remote object. This makes real-time position analysis difficult, if not impossible in certain applications.

On the other hand, least-squares approaches have been considered; for example, the so-called Moore-Penrose pseudo-matrix-inverse technique has been considered by some investigators. The Moore-Penrose technique can be applied either recursively or non-recursively. When the Moore-Penrose technique is applied recursively, the result is similar to, and in some cases equivalent to, the Kalman-Bucy filter technique. In contrast, in the past, investigators have almost universally rejected the non-recursive application of the Moore-Penrose technique because the calculation of the matrix products required by the technique appear to result in an unhandleable growth in the number and complexity of calculations, especially in consideration of the large quantities of data representing numerous position measurements for accurate determinations, as discussed above. This apparent growth would appear to require the support of a large computational capability, which may significantly impact the cost of implementing such a scheme. Again, the large computional burden resulting from the application of the technique precludes its use in many real-time applications The Moore-Penrose pseudo-matrix-inverse technique, however, does have distinct advantages in that it requires no initialization and linearizing assumptions.

It should be also noted that coming of interest recently are digital topographical map concepts in which the features of a particular terrain or surface of interest are represented by digitized quantities which can be plotted or otherwise used to represent the terrain or surface. Such digital map concepts are described, for example, in "Airborne Electronic Map Systems, Part I - Design", Proc. IEEE, NAECON Conference, 1981, by Gerald O. Burnham, and "Airborne Electronic Map Systems, Part II- Applications", supra. Additionally, the application of the techniques of this invention to terrain following, terrain avoidance problems is described in copending patent application entitled METHOD FOR PASSICE TERRAIN FOLLOWIND AND AVOIDANCE, Ser. No. 568,677, filed Jan. 6, 1984, currently pending, and assigned to the assignee hereof, said application being incorporated by reference herein.

In attempts to achieve navigational abilities of vehicles (vehicles being used herein to denote generally any movable object, such an aircraft, ship, missile, car, robot etc.) by sensing the local terrain, usually some form of active device is considered. In the case of aircraft, for instance, terrain following radars are used in which radio signals are transmitted, usually forwardly and downwardly, from an aircraft, and the time at which the echo is received and the direction from which it arrives are processed to ultimately determine the location of the underlying terrain or surface with respect to the aircraft. Aside from sending electromagnetic signals outside the vehicle, such devices may not be forward looking, and are capable of detecting only changes in altitude of the aircraft with respect to the ground directly underneath it. This has the disadvantage of not being able to detect sudden rises in terrain, and makes the use of the device limited to areas only in which gradual or predictable terrain changes exist.

Passive devices capable of forward or downward looking exist in which a picture of the terrain directly in front of a vehicle (or in some convenient direction with respect to the vehicle) is generated. An example of such device is a forward looking infrared receiver (FLIR), and in fact, the method of the present invention can be practiced in conjunction with signals generated by such FLIR, although it will be appreciated that in fulfilling an object of the invention of achieving passive position information, such FLIR signals in some instances may be discarded in favor of other passive signal generation means, such as television signals or the like, as will become apparent below.

SUMMARY OF THE INVENTION

In light of the above, it is an object of the invention to provide a method for passively determining the position or location of an a moving observer with respect to a remote stationary object or a multiplicity of such objects.

It is another object of the invention to provide a method of the type described which can be accomplished using presently available digital computer equipment, and in which calculations can be done extremely rapidly, without requiring a large calculation storage memory.

It is another object of the invention to provide a method of the type described which employs a nonrecursive least squares technique employing a Moore-Penrose pseudo-matrix-inverse to provide information of relative location with respect to one or more remote objects to develop data which can be used to determine the absolute position of the observer station.

It is another object of the invention to provide a method of the type described which can be used to control the movement of a vehicle.

It is another object of the invention to provide a method of the type described which can be achieved with inexpensive existing equipment.

These and other objects, features, and advantages will become apparent to those skilled in the art from the following detailed description when read in conjunction with the accompanying drawing and appended claims.

The invention, in its broad aspect, presents a method for passive relative ranging between a position of a moving observer and a stationary remote object. The method includes measuring at least one angle at the observer's position to the object from a reference direction at a first time, then measuring at least another angle at the observer's position to the object from the reference direction at a second time. From successive measured angles, the current relative location of the observer with respect to the object is calculated with increasing precision using a non-recursive least squares estimating algorithm.

In another aspect of the invention, the position of the observer relative to the surface is controlled by determining the relative location of the observer with respect to a plurality of objects.

A least squares estimating algorithm employing a Moore-Penrose pseudo-matrix-inverse, executed by a digital computer is used in practicing a preferred embodiment of the invention. Although various other estimating algorithms may be used to advantage, it has been found that use of the Moore-Penrose estimating algorithm enables particular efficiency to be achieved, in some cases enabling the invention to be useful in fast response time or low cost required environments.

BRIEF DESCRIPTION OF THE DRAWING

The invention is illustrated in the accompanying drawing, in which.

In the various figures of the drawing, the same reference numerals are used to denote the same or similar parts. In addition, various sizes and dimensions of various items in the drawings have been exaggerated or distorted for clarity of illustration and ease of description.

DETAILED DESCRIPTION OF THE PREFERRED EMBODIMENTS

Figure 1:
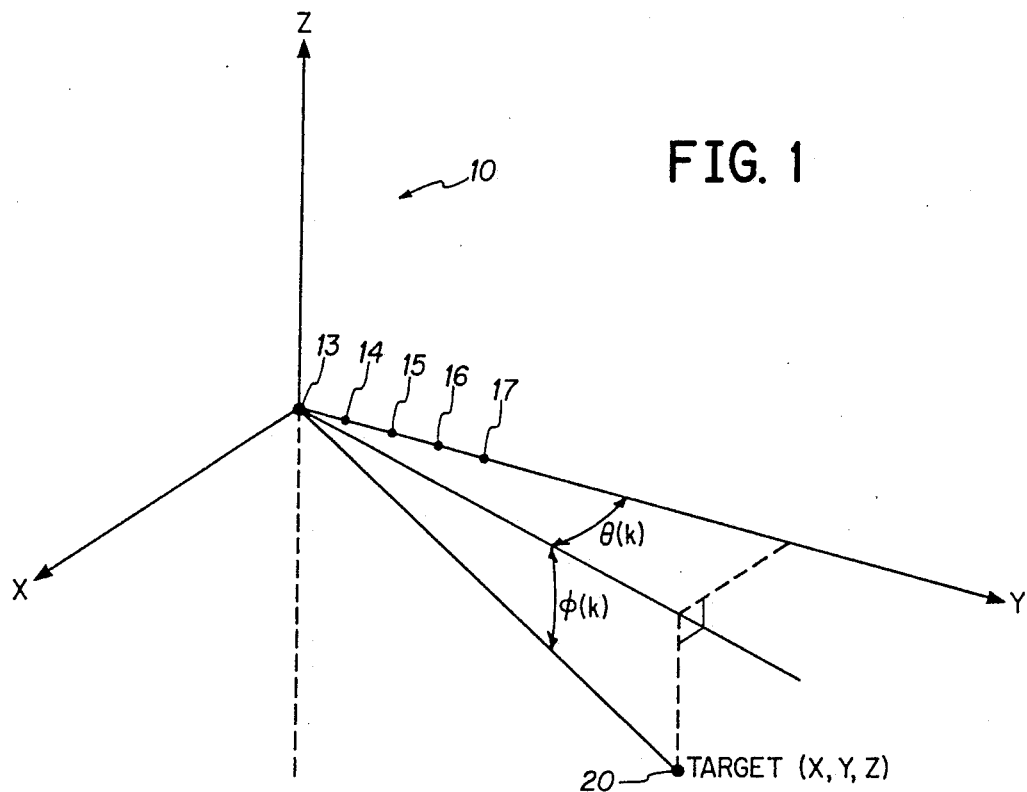
FIG. 1 is a graphical representation of an observing station moving with respect to a stationary object showing the angular relationships used in practicing the method of the invention.

The method in accordance with a preferred embodiment of the invention is passively determining the relative location of a moving observer or observing station relative to a stationary object or a plurality of such objects. The method is ultimately useful, as an example, in determining the relative location of the observer with respect to an underlying surface, or for controlling the position of the observer with respect to the object, objects, or underlying surface. The method is further ultimately useful for providing information from which the observer can be navigated or controlled with respect to an object, a plurality of objects or a surface upon which a plurality of such objects rest. Although the position of the observer or observer's station is described below as being in relative motion with respect to a stationary object, it will be understood that the term relative motion is intended to convey the notion that the system can be considered from the viewpoint of the observer as if only the observer were in motion with respect to a stationary object. If the object is in motion, then the motion of the object must be known.

The method presented is a passive position or location determination, as opposed to techniques in which outside signals are relied upon, for instance, radars, sonars, and the like which transmit some signal outside the system for the particular purpose of the system, or satellite or radio navigation systems which employ man-made signal from outside the system. Thus, as used herein, a passive system is one in which no outside signals need to be relied upon in the steps of the determination. (It should be noted that active signals can be used in some cases in practicing the instant invention if they are conveniently available, but are not a requirement of the system described, so it will therefore be understood that the term "passive" is used herein to denote a method which might be accomplished by passively derived signals, even though actively derived signals may be used in a particular instance.)

The method can best be seen from the graph of FIG. 1, which is described with reference to an x-y-z or Cartesian coordinate system 10. An observer (not shown) is assumed to be moving along the y-axis, and at times kT will be sequentially located at points 13, 14, 15, 16, 17, and so forth, on the y-axis. A stationary target, denoted "Target", is located at a point 20, and has coordinates (x,y,z). In accordance with the method of the invention, each time the observer reaches one of the points 13, 14, 15, 16, and 17 (i. e. at each kT, where k=1, 2, 3, 4, 5 and so on and T is a fixed time increment) the "Target" at location 20 is observed, and the angular position of the "Target" with respect to the Cartesian coordinate system 10 is noted. Thus, for example, at point 13, the "Target" is observed to be at an angle $\theta(1)$ from the y-axis and $\Phi(1)$ from the plane defined by the x- and y-axes. Then, at point 14, the "Target" is observed to be at an angle $\theta(2)$ from the y-axis and $\Phi(2)$ from the x-y plane ($\theta(2)$ and $\Phi(2)$ are not shown). This measuring step is thereafter repeated at each time increment kT to derive similar angular measurements, denoted $\theta(k)$ and $\Phi(k)$ on the drawing (also not shown).

With the measurements thus taken, the location of the observer relative to the "Target" can be found from the following equations (the matrix being referred to hereinafter as "equation (1)":

$$\begin{bmatrix} 1 & -\tan\theta(1) & 0 \\ 0 & \frac{\tan\Phi(1)}{\cos\theta(1)} & 1 \\ 1 & -\tan\theta(2) & 0 \\ 0 & \frac{\tan\Phi(2)}{\cos\theta(2)} & 1 \\ \vdots & & \\ 1 & -\tan\theta(N) & 0 \\ 0 & \frac{\tan\Phi(N)}{\cos\theta(N)} & 1 \end{bmatrix} \cdot \begin{bmatrix} X \\ Y \\ Z \end{bmatrix} = \begin{bmatrix} -Y_0(1)\tan\theta(1) + X_0(1) \\ Y_0(1)\left(\frac{\tan\Phi(1)}{\cos\theta(1)}\right) + Z_0(1) \\ -Y_0(2)\tan\theta(2) + X_0(2) \\ Y_0(2)\left(\frac{\tan\Phi(2)}{\cos\theta(2)}\right) + Z_0(2) \\ \vdots \\ -Y_0(N)\tan\theta(N) + X_0(N) \\ Y_0(N)\left(\frac{\tan\Phi(N)}{\cos\theta(N)}\right) + Z_0(N) \end{bmatrix}$$

where:

$\theta(k)$ = the bearing of the "Target" at time kT $\Phi(k)$ = depression angle of the "Target" at time kT and are illustrated graphically in FIG. 1

$X_o(k)$ = observer's x-axis position at time kT $Y_o(k)$ = observer's y-axis position at time kT $Z_o(k)$ = observer's z-axis position at time kT where T is the time between samples k is an integer such that $1 <= k <= N$ for each of the above expressions N is the total number of sample-pairs [$\theta(k)$, $\Phi(k)$] acquired to the current time.

Thus, $\theta(1)$ in equation (1) corresponds to $\theta(k)$ for k=1.

Figure 2:
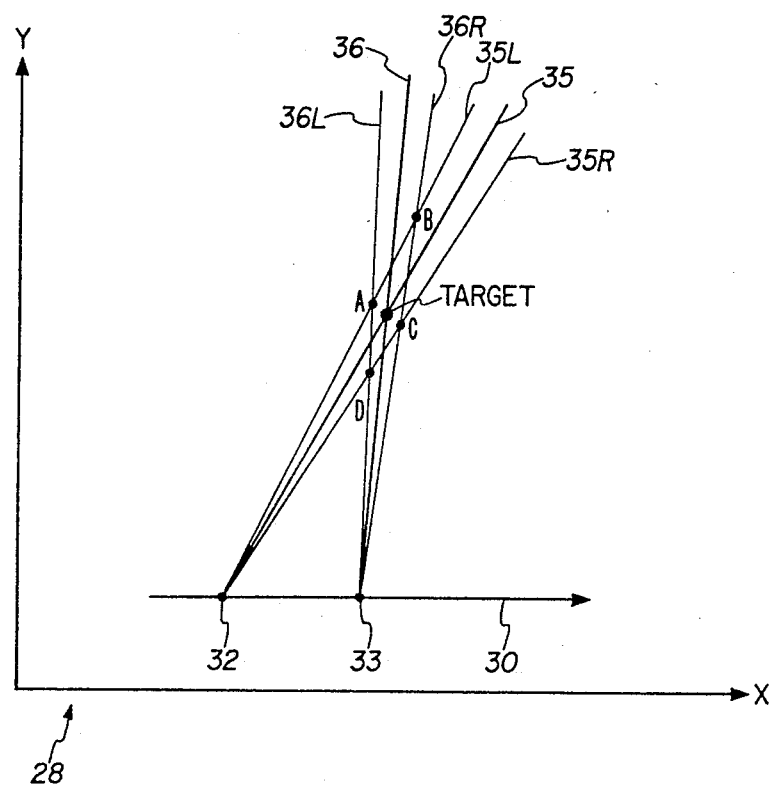
FIG. 2 is a graphical representation of an observing station moving with respect to a stationary object showing the error factors generated in angular measurements made in accordance with the invention.

If the angular measurements made in practicing the method of the invention, as above set forth, were absolutely accurate, any three of these equations would be sufficient to correctly determine the position of the observer, except when they are made along a line passing through the "Target". However, in practicing the position determining method, the angular measurements which are made will likely have error in them to an extent that the relative position determination made will not be entirely accurate. This can be better appreciated from an examination of FIG. 2, a two-dimensional graph exemplifying the position determining method of the invention on an x-y axis 28. Thus, as an observer (not shown) moves along a line 30, the "Target" may be sequentially observed from respective points 32 and 33. If the angular observation were totally accurate, the angular observations would be along the lines 35 and 36, which contain the points 32 and "Target" and 33 and "Target", respectively. However, as mentioned, errors will likely occur in the angular measurements, so the measured angle from point 32 will be somewhere between the lines 35L and 35R, each of which are displaced from the actual position line 35 by an appropriate amount of error deviation. Likewise, the measured angle from point 33 will be somewhere between lines 36L and 36R. After the angular observations from points 32 and 33 are made, therefore, all that can be concluded about the relative location of the "Target" with respect to the observer is that the "Target" lies somewhere within the quadrilateral defined by points A, B, C, and D at the intersections of lines 35L, 35R, 36L, and 36R.

Despite the errors which may be introduced into the measurements, it can be seen that as more measurements are made, the lower the error factors introduced into the certainty of the location of the "Target". Thus, as a greater number of measurements are made, the error deviation approaches zero.

As will become apparent, in accordance with a preferred embodiment of the invention, the angular measurements are provided as digital inputs to a special or general purpose digital computer (not shown), programmed to implement the equations set forth above. It is noted, however, that the larger the number of angle data which is inputted into the computer, the longer the time which will be required by the computer to make the necessary position computations. This is the point, as mentioned above, that the problem seen by investigators in the past has appeared to become impractical to solve, since the complexity and number of calculations required appear to be beyond the capabilities of presently known digital computers, especially those of the type which can conveniently be carried on board a vehicle, such as a robot or the like.

In order to accomplish both the accommodation of a large number of angular measurement data and the reduction of the required computational time to process it, I have discovered that the use of a least squares technique employing the Moore-Penrose pseudo-matrix inverse can be used to particularly advantage. The least squares technique employing the Moore-Penrose pseudo-matrix inverse is given by:

$$\hat{X}(N) = [A'(N)A(N)]^{-1}A'(N)B(N) \quad \text{equation (2)}$$

where $\hat{X}$ = least squares optimal estimate of X, given measurements $\theta(1), \theta(2), \theta(3) \ldots \theta(N)$ and $\Phi(1), \Phi(2), \Phi(3), \ldots \Phi(N)$, and X = [X Y Z]' which is the true "Target" location estimated after N-observations.

A(N) and B(N) are defined by equation (1) above where equation (1) is written in the matrix form:

A(N)X = B(N), and where, an underline (_) denotes that the matrix is a one dimensional vector,

[ ]' denotes matrix transpose and

[ ]$^{-1}$ denotes matrix inverse.

Enabling this Moore-Penrose estimate to be implemented in a general or special purpose digital computer I have discovered that all the required calculations can be carried out using an appropriate machine language, without a requirement for excessively large memory or intermediate data or computational storage. The method uses only addition, multiplication, division and accumulation can be performed using the steps set forth in Table I below. It should be noted that the TMS320 Signal Processing Chip manufactured by Texas Instruments Incorporated of Dallas, Tex., can easily accomplish the steps mentioned, as set forth in Table 1.

TABLE 1

| Step | Operation |
|---|---|
| 1 | $B(0) = C(0) = D(0) = E(0) = F(0) = G(0) = H(0) = J(0) = N(0) = R(0) = Q(0) = S(0) = 0$ |
| 2 | $K = 1$ |
| 3 | $\alpha(K) = \tan \theta(K)$ |
| 4 | $\beta(K) = \tan \phi(K)$ |
| 5 | $\gamma(K) = \cos \theta(K)$ |
| 6 | $\delta(K) = [\alpha(K)]^2$ |
| 7 | $\rho(k) = \beta(K)/\gamma(K)$ |
| 8 | $\mu(K) = [\rho(K)]^2$ |
| 9 | $B(K) = B(K - 1) + \mu(K)$ |
| 10 | $C(K) = C(K - 1) + \alpha(K)$ |
| 11 | $D(K) = D(K - 1) + \delta(K)$ |
| 12 | $E(K) = E(K - 1) + X_o(K)$ |
| 13 | $F(K) = F(K - 1) + \alpha(K)Y_o(K)$ |
| 14 | $G(K) = G(K - 1) + \alpha(K)X_o(K)$ |
| 15 | $H(K) = H(K - 1) + \delta(K)Y_o(K)$ |
| 16 | $J(K) = J(K - 1) + Z_o(K)$ |
| 17 | $N(K) = N(K - 1) + \rho(K)Y_o(K)$ |
| 18 | $R(K) = R(K - 1) + \rho(K)$ |
| 19 | $Q(K) = Q(K - 1) + \mu(K)Y_o(K)$ |
| 20 | $S(K) = S(K - 1) + \rho(K)Z_o(K)$ |
| 21 | $L(K) = E(K) - F(K)$ |
| 22 | $U(K) = H(K) - G(K) + Q(K) - S(K)$ |
| 23 | $V(K) = -N(K) + J(K)$ |
| 24 | $W(K) = D(K) + B(K)$ |
| 25 | $\Gamma(K) = KW(K) - [R(K)]^2$ |
| 26 | $T(K) = KU(K) + V(K)R(K)$ |
| 27 | $\pi(K) = W(K)V(K) + U(K)R(K)$ |
| 28 | $\Omega(K) = C(K)V(K)$ |
| 29 | $\Lambda(K) = KC(K)$ |
| 30 | $\psi(K) = L(K)C(K)$ |
| 31 | $\Delta(K) = K(K) - C(K)\Lambda(K)$ |
| 32 | $X(K) = [L(K)\Gamma(K) + C(K)T(K)]/\Delta(K)$ |
| 33 | $Y(K) = [KT(K) + K\psi(K)]/\Delta(K)$ |
| 34 | $Z(K) = [K\pi(K) - C(K)\Omega(K) + R(K)\psi(K)]/\Delta(K)$ |
| 35 | $K = K + 1$ |

The steps set forth in Table 1 are all the computations necessary for each set of estimated coordinates $\hat{X}$, $\hat{Y}$, and $\hat{Z}$. The steps 3 through 35 are repeated for each subsequent set of angular measurements to update the coordinate estimate, reducing the error factor in the resultant.

When equation 2 is multiplied out term by term, the terms of the result vector consist of summations of terms. The number of terms in the summations depends on the number of rows in the starting matrices, which in turn depend on the number of observations made. This algorithm implements the summation procedure by looping. The terms defined in steps 3–8 of the algorithm collect the terms in the inverse matrix of A(N), and the remaining steps simply combine them in a manner well known in the art according to the algebra set forth in equation 2. Walking through the algorithm by hand implements the same calculations as are made when the matrices are multiplied directly by hand.

It will be appreciated from an examination of the steps set forth in Table 1, that only twelve accumulating variables are defined (step 1), and that each time steps 3 through 35 are repeated, the derived values set forth in step 1 are accumulated, not recalculated. Therefore, very little computer memory is required to accomplish the calculations, and the cumulative positional estimates merely become increasingly accurate each time new angular position values are input to the system. Furthermore, because the method set forth in Table 1 is so efficient, a larger number of samples can be processed in any given time than with previous methods, enabling highly accurate estimates to be developed with practically real time processing.

Using the method described above enables not only the estimating of an observer's position with respect to a particular object, but by expanding the method to include a number of objects, can be used as well to develop navigational information for a vehicle. An example of such navigation information processing in terrain following and terrain avoidance can be seen in copending patent application entitled "METHOD FOR PASSIVE TERRAIN FOLLOWING AND AVOIDANCE", mentioned above. Thus, for example, by estimating the relative position of a moving observer's station with respect to several objects, the station can be maneuvered in such a way to avoid (or to strike) any of the objects. For example, using the method described, a moving robot can be operated in such a way as to move a member to pick up a fixed object or to catch an object moving with a known velocity.

Figure 3:
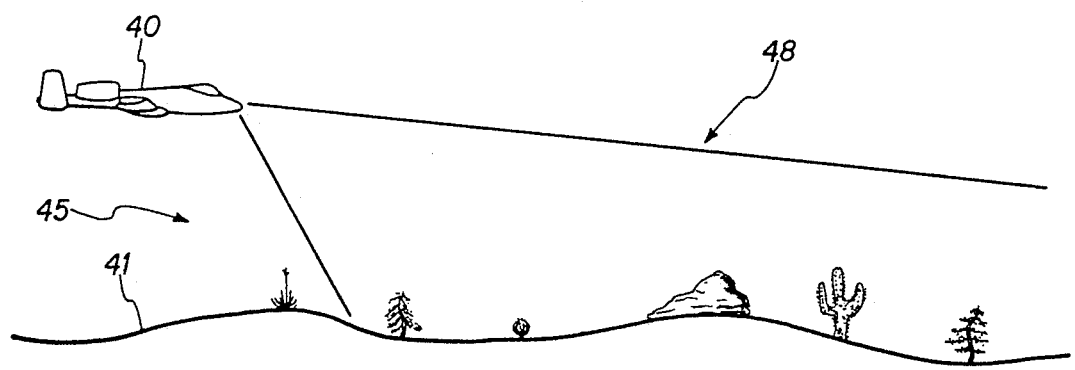
FIG. 3 is a side elevational view of an aircraft traversing an underlying terrain or surface using the method of the invention for effecting terrain avoidance or navigational guidance.
Figure 4:
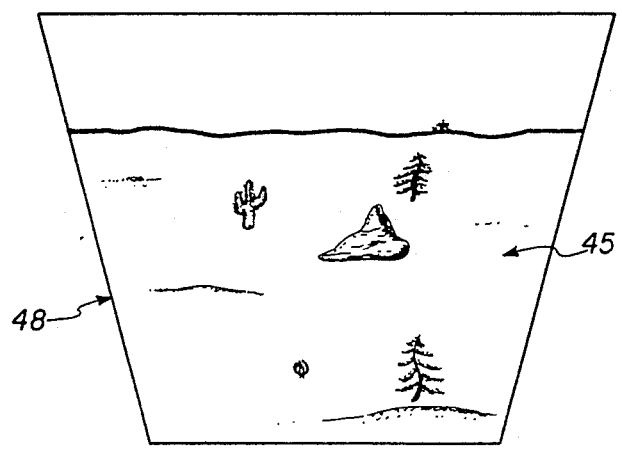
FIG. 4 is a perspective view of the terrain underlying and as seen by the aircraft of FIG. 3 at a particular instant in time.

In addition to the foregoing, it will be appreciated that with data or information locating a plurality of objects relative to an observer's station, a relative map of the area can be generated, for display, for instance, in an aircraft cockpit, for generation of digital computer data or for manifold other purposes as will be apparent to those skilled in the art. For example, with reference to FIG. 3, an aircraft 40 is shown travelling over a particular terrain or earth surface 41. A number of "objects of opportunity" 45 are located on the surface 41, such as rocks, trees, bushes and such. By use of angular locating means (not shown) on board the aircraft, the relative locations of a preselected number of objects of opportunity are determined within, for example, an area forwardly located with respect to the aircraft, within a viewing area 48. From within the aircraft, the area 48 might appear as shown in FIG. 4. It can be seen that as the airplane advances, it may locate any or all of the objects of opportunity 45 within its area of view, and, as mentioned, can develop a map of the relative locations of them.

With the map information thus developed, the information can be compared with a known, preexisting map of the area, and the exact or absolute position of the vehicle determined. If desired, the vehicle can thereafter be navigated in accordance with the absolute map data, updated as new objects of opportunity come into the area of view 48. Inasmuch as a general purpose digital computer is preferred to implement the steps of the method of the invention, a digital map, as described, for instance, in "Airborne Electronic Map Systems, Part I - Design", and "Airborne Electronic Map Systems, Part II - Applications", supra, may be stored in a memory section associated with the computer. The object of opportunity positional information can be represented in the form of digital signals (and formed into a relative digital map), and the maps can be compared to determine the absolute vehicle position in the manner described above.

Although the invention has been described and illustrated with a certain degree of particularity, it will be understood that the present disclosure has been made by way of example only and that numerous changes in the arrangement and combination of steps or parts in practicing the method of the invention may be resorted to by those skilled in the art within the spirit and the scope of the invention as hereinafter claimed.

I claim:

1. A method for determining the position of a stationary remote object relative to a moving vehicle comprising the steps of:
   (a) establishing a reference direction;
   (b) measuring a first angle between the reference direction and the stationary object when the vehicle is at a first location;
   (c) moving the vehicle to a second location;
   (d) measuring a second angle between the reference direction and the stationary object when the vehicle is at the second location;
   (e) after step (d), determining a position of the stationary object relative to the vehicle using the Moore-Penrose pseudo-matrix-inverse technique, wherein the angles measured in steps (b) and (d) are used as inputs to said technique;
   (f) constructing a digital representation of the surface supporting said object from the determined position; and
   (g) using the digital representation to control the movement of the vehicle relative to said surface.

2. The method of claim 1, wherein the reference direction has a known relationship to the direction of motion of the vehicle.

3. The method of claim 1, wherein the moving referred to in step (c) is maneuvering.

4. The method of claim 1, wherein said vehicle is any object which moves spatially.

5. The method of claim 1, wherein the position of the second location is known relative to the position of said first location.

6. The method of claim 5, wherein said known relative position is also inputted in step (e) in addition to the angles measured in steps (b) and (d).

7. The method of claim 1, wherein said step (g) of using the digital representation to control the movement of the vehicle relative to said surface, further comprising the steps of:
   (h) matching the digital representation to a known map representation of the Earth's surface over which the vehicle is traversing;
   (i) determining the position of the vehicle relative to locations indicated by the map; and
   (j) thereafter using the map as a reference to control the position of the vehicle relative to said surface.

8. A method for determining the position of a moving vehicle relative to the Earth, comprising the steps of:
   (a) establishing a reference direction;
   (b) measuring angles between the reference direction and a plurality of stationary objects on the Earth at a first time;
   (c) moving the vehicle;
   (d) measuring angles between the reference direction and the stationary objects at a second time whereby the position of the vehicle has changed between steps (b) and (c);
   (e) calculating a position for the vehicle relative to the stationary objects using the Moore-Penrose pseudo matrix-inverse technique wherein the angles measured in steps (b) and (d) are used as inputs thereto, and saving predetermined intermediate results generated during said calculating step;
   (f) continuing to move the vehicle;
   (g) measuring additional angles between the reference direction and the stationary objects at additional times;
   (h) calculating updated positions for the vehicle relative to the stationary objects using the Moore-Penrose pseudo-matrix-inverse techniques for the additional times, using said predetermined intermediate results saved from previous calculations made in steps (e) and (h) and the angles measured in step (g), and saving predetermined intermediate results generated during said calculation of updated positions;
   (i) constructing a digital representation of the Earth's surface supporting the objects from the calculated positions; and
   (j) using the digital representation to control the movement of the vehicle relative to said surface.

9. The method of claim 8, wherein the reference direction has a known relationship to the direction of motion of the vehicle.

10. The method of claim 8, wherein the moving referred to in steps (c) and (f) is maneuvering.

11. The method of claim 8, wherein said vehicle is any object which moves spatially.

12. The method of claim 8, wherein the position of the vehicle at the second time is known relative to the position of the vehicle at said first time, and wherein the position of the vehicle at each of said additional times is known relative to the position of the vehicle at each immediately previous additional time.

13. The method of claim 12, wherein said known relative position is inputted in steps (e) and (h) in addition to said angles measured.

14. The method of claim 8, wherein said step (j) of using the digital representations to control the movement of the vehicle relative to said surface, further comprising the steps of:
   (k) matching the digital representation to a known map representation of the Earth's surface over which the vehicle is traversing;
   (l) determining the position of the vehicle relative to locations indicated by the map; and
   (m) thereafter using the map as a reference to control the position of the vehicle relative to said surface.

15. A method for determining the position of a moving vehicle relative to the Earth, comprising the steps of:
   (a) establishing a reference direction;
   (b) measuring angles between the reference direction and a plurality of stationary objects on the Earth at a first time;
   (c) moving the vehicle;
   (d) measuring angles between the reference direction and the stationary objects at a second time whereby the position of the vehicle has changed between steps (b) and (c);
   (e) calculating a position for the vehicle relative to the stationary objects using the Moore-Penrose pseudo-matrix-inverse techniques wherein the angles measured in steps (b) and (d) are used as inputs thereto, and saving predetermined intermediate results generated during said calculating step;

(f) continuing to move the vehicle;

(g) measuring additional angles between the reference direction and the stationary objects at additional times;

(h) calculating updated positions for the vehicle relative to the stationary objects using the Moore-Penrose pseudo-matrix-inverse technique for the additional times, using said predetermined intermediate results saved from previous calculations made in steps (e) and (h) and the angles measured in step (g), and saving predetermined intermediate results generated during said calculation of updated positions;

(i) constructing a digital representation from the Earth's surface supporting the stationary objects from the calculated position;

(j) matching the digital representation to a known map representation of the Earth's surface over which the vehicle is traversing;

(k) determining the position of the vehicle relative to locations indicated by the map; and (l) thereafter using the map as a reference to control the position of the vehicle relative to said surface.

16. The method of claim 15, wherein the reference direction has a known relationship to the direction of motion of the vehicle.

17. The method of claim 15, wherein the moving referred to in steps (c) and (f) is maneuvering.

18. The method of claim 15, wherein said vehicle is any object which moves spatially.

19. The method of claim 15, wherein the position of the vehicle at the second time is known relative to the position of the vehicle at said first time, and wherein the position of the vehicle at each of said additional times is known relative to the position of the vehicle at each immediately previous additional time.

20. The method of claim 19, wherein said known relative position is inputted in steps (e) and (h) in addition to said angles measured.

21. A method for passively determining the relative location of a moving vehicle relative to at least one stationary remote object, comprising the steps of:

(a) establishing a reference direction;

(b) measuring at least one angle at the vehicle's position to the object from the reference direction at a first time;

(c) moving the vehicle;

(d) repeating said measuring step at predetermined time intervals a predetermined number of times, whereby the vehicle is at different locations for each of the measuring steps;

(e) establishing a matrix of values representing functions of said angle measurements;

(f) calculating from said matrix the current relative location of the moving vehicle with respect to said at least one object using a least squares estimating algorithm;

(g) constructing a digital representation of the surface supporting said at least one object from the calculated location;

(h) using the digital representation to control the movement of the vehicle relative to said surface.

22. The method of claim 21, wherein said estimating algorithm is a least squares technique employing the Moore-Penrose pseudo-matrix-inverse.

23. The method of claim 21, wherein said vehicle is any object which moves spatially.

24. The method of claim 21, wherein the moving referred to in steps (c) and (f) is maneuvering.

25. The method of claim 21, wherein the position of the vehicle at each of said different locations is known relative to the position of the vehicle at each immediately previous location.

26. The method of claim 25, wherein said known relative position is inputted in step (f) in addition to said matrix.

27. The method of claim 21, wherein said step (h) of using the digital representation to control the movement of the vehicle relative to said surface, further comprising the steps of:

(i) matching the digital representation to a known map representation of the Earth's surface over which the vehicle is traversing;

(j) determining the position of the vehicle relative to locations indicated by the map; and (k) thereafter using the map as a reference to control the position of the vehicle relative to said surface.

28. A method for determining the position of a stationary remote object relative to a moving vehicle comprising the steps of:

(a) establishing a reference direction;

(b) measuring a first angle between the reference direction and the stationary object when the vehicle is at a first location;

(c) maneuvering the vehicle to a second location;

(d) measuring a second angle between the reference direction and the stationary object when the vehicle is at the second location is known relative to the position of the vehicle at said first location;

(e) after step (d), determining a position of the stationary object relative to the vehicle using the Moore-Penrose pseudo-matrix-inverse technique, wherein the known relative position and the angles measured in steps (b) and (d) are used as inputs to said technique;

(f) constructing a digital representation of the surface supporting the stationary object from the determined position;

(g) matching the digital representation to a known map representation of the surface over which the vehicle is traversing;

(h) determining the position of the vehicle relative to locations indicated by the map; and (i) thereafter using the map as a reference to control the position of the vehicle relative to said surface.

29. The method of claim 28, wherein said vehicle is any object which moves spatially.

30. The method of claim 28, wherein the reference direction has a known relationship to the direction of motion of the vehicle.

31. A method for determining the position of a moving vehicle relative to the Earth, comprising the steps of:

(a) establishing a reference direction;

(b) measuring angles between the reference direction and a plurality of stationary objects on the Earth at a first time;

(c) maneuvering the vehicle;

(d) measuring angles between the reference direction and the stationary objects at a second time whereby the position of the vehicle has changed between steps (b) and (c), wherein the position of the vehicle at the second time is known relative to the position of the vehicle at said first time;

(e) calculating a position for the vehicle relative to the stationary objects using the Moore-Penrose pseudo-matrix-inverse technique wherein the known relative position and the angles measured in steps (b) and (d) are used as inputs thereto, and saving predetermined intermediate results generated during said calculating step;

(f) continuing to maneuver the vehicle;

(g) measuring additional angles between the reference direction and the stationary objects at additional times, wherein the position of the vehicle at each additional time is known relative to the position of the vehicle at each previous time;

(h) Calculating updated positions for the vehicle relative to the stationary objects using the Moore-Penrose pseudo-matrix-inverse technique for the additional time, using said predetermined intermediate results saved from previous calculations made in steps (e) and (h), the known relative position, and the angles measured in step (g), and saving predetermined intermediate results generated during said calculation of updated positions;

(i) constructing a digital representation of the Earth's surface supporting the stationary objects from the calculated positions;

(j) matching the digital representation to a known map representation of the Earth's surface over which the vehicle is traversing;

(k) determining the position of the vehicle relative to locations indicated by the map; and (l) thereafter using the map as a reference to control the position of the vehicle relative to said surface.

32. The method of claim 31, wherein said vehicle is any object which moves spatially.

33. The method of claim 31, wherein the reference direction has a known relationship to the direction of motion of the vehicle.

* * * * *